United States Patent [19]

Mason

[11] Patent Number: 4,474,162
[45] Date of Patent: Oct. 2, 1984

[54] CHARGE AIR COOLER MOUNTING ARRANGEMENT

[75] Inventor: John L. Mason, Palos Verdes Estates, Calif.

[73] Assignee: The Garrett Corporation, Los Angeles, Calif.

[21] Appl. No.: 471,371

[22] Filed: Mar. 1, 1983

[51] Int. Cl.³ .................... F02M 31/00; F28F 1/32
[52] U.S. Cl. .................... 123/563; 123/542; 165/149; 165/166
[58] Field of Search ............... 123/542, 563; 165/152, 165/153, 149, 166; 29/157.3 R

[56] References Cited

U.S. PATENT DOCUMENTS

| 1,833,666 | 11/1931 | Watson et al. |
| 2,015,819 | 10/1935 | Seligman et al. |
| 2,029,083 | 1/1936 | Prestage . |
| 2,472,413 | 6/1949 | Gantvoort . |
| 2,529,013 | 11/1950 | Gloyer . |
| 2,663,170 | 12/1953 | Gloyer . |
| 2,846,197 | 8/1958 | Berg et al. |
| 2,917,292 | 12/1959 | Hitrich . |
| 2,961,222 | 11/1960 | Butt . |
| 2,985,433 | 5/1961 | Simpelaar . |
| 3,017,161 | 1/1962 | Slaasted et al. |
| 3,360,038 | 12/1967 | Stampes . |
| 3,444,925 | 5/1969 | Johnson ............... 165/166 |
| 3,865,185 | 2/1975 | Ostbo . |
| 4,025,462 | 5/1977 | Cleveland ............ 165/166 |
| 4,058,980 | 11/1977 | Ahlen . |
| 4,303,052 | 12/1981 | Manfredo . |
| 4,436,145 | 3/1984 | Manfredo ............ 123/563 |

Primary Examiner—Ronald H. Lazarus
Attorney, Agent, or Firm—Stuart O. Lowry; James W. McFarland; Albert J. Miller

[57] ABSTRACT

A plate and fin type heat exchanger is provided with an improved mounting arrangement for mounting the heat exchanger, for example, within the intake manifold of a combustion engine for use as a charge air cooler. A plurality of threaded nuts are secured as by welding at predetermined points at the inboard sides of the heat exchanger side plates for receiving bolts passed through aligned bolt-receiving holes in the intake manifold and side plates to secure the heat exchanger in place, thereby providing a mounting arrangement permitting the heat exchanger to occupy substantially the entire cross-sectional area of the intake manifold for optimized heat transfer capacity.

13 Claims, 6 Drawing Figures

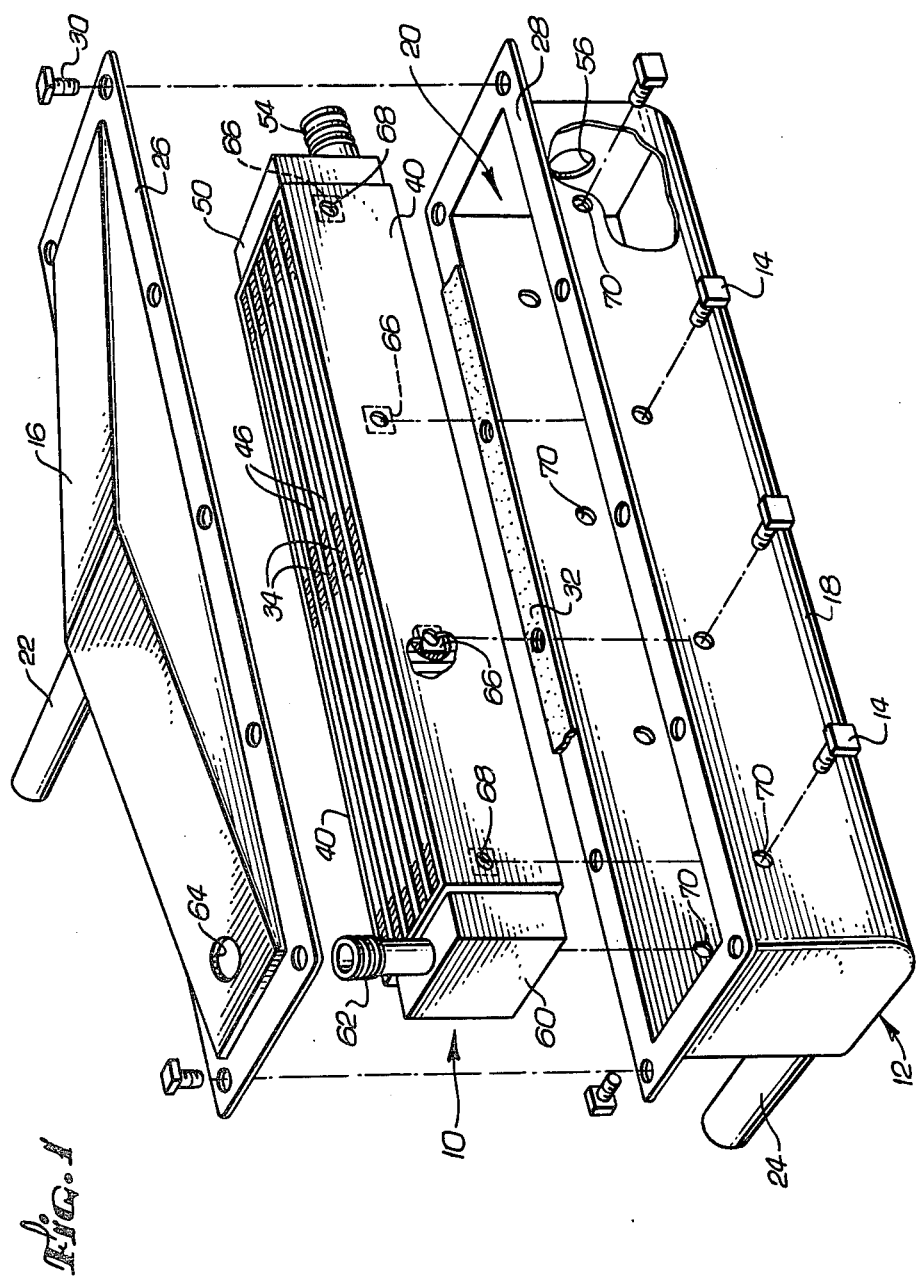

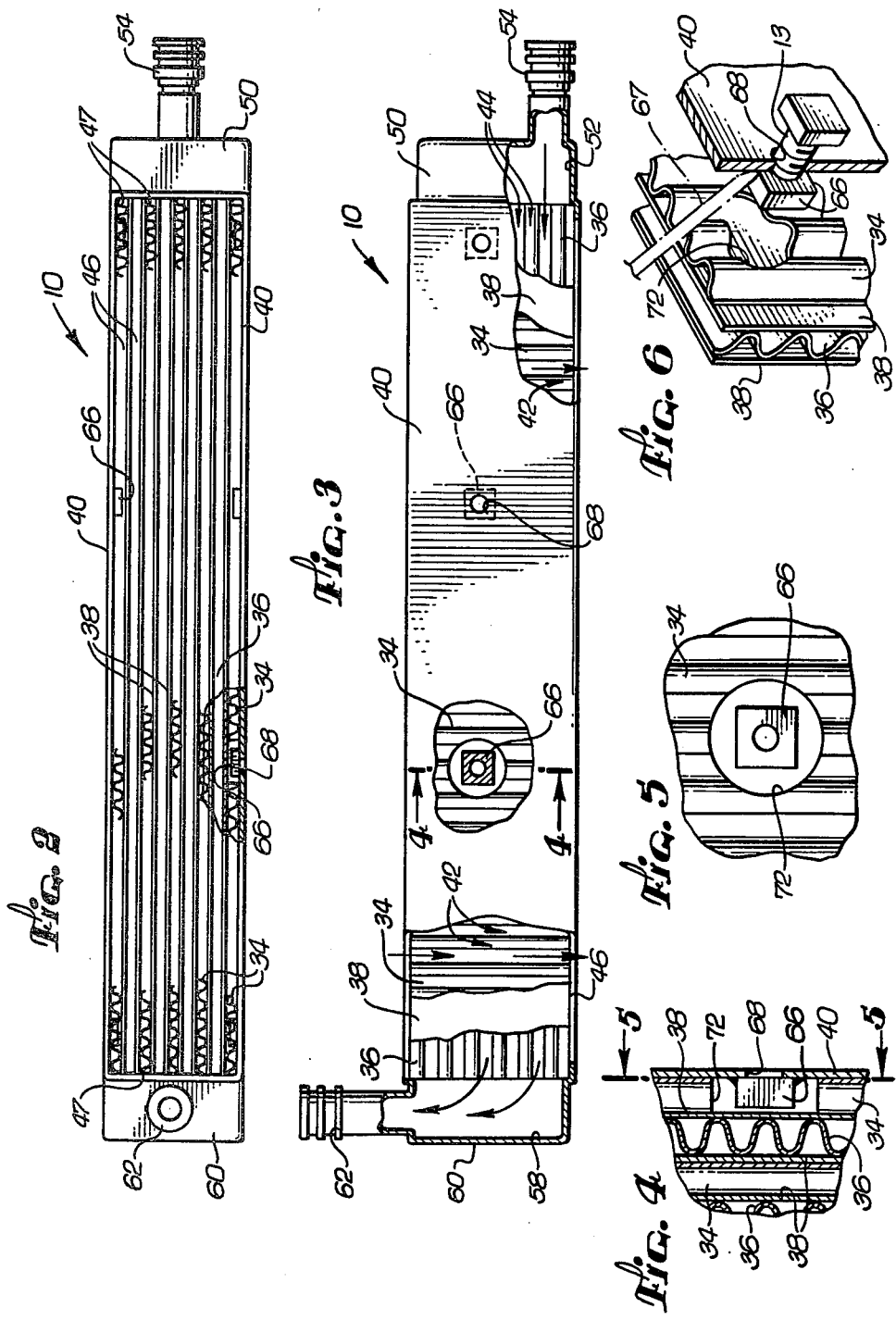

CHARGE AIR COOLER MOUNTING ARRANGEMENT

BACKGROUND OF THE INVENTION

This invention relates generally to heat exchangers such as so-called charge air coolers for reducing the temperature of air inflow to a combustion engine. More specifically, this invention relates to an improved mounting arrangement for mounting a heat exchanger of the plate and fin type into the air intake manifold of a combustion engine for optimized heat transfer capacity.

Charge air cooler heat exchangers are well known in the art for mounting along the flow path of charge air supplied to a combustion engine. This charge air typically comprises ambient air which has been compressed by apparatus such as a supercharger or turbocharger to provide an increased mass flow of air to the engine to permit the engine to combust increased quantities of fuel and thereby operate at an increased level of power and performance. However, compression of ambient air also elevates the air temperature such that the charge air has a relatively high temperature which, if not reduced, undesirably increases total engine heat load. It is therefore desirable to cool the charge air prior to supply thereof to the engine, and charge air coolers are provided for this purpose.

In general, the charge air cooler is constructed from a plurality of lightweight heat transfer elements of a heat conductive material, such as copper or aluminum, shaped to provide extended heat transfer surfaces and defining a flow path for the charge air in heat transfer relation with a suitable coolant, such as ambient air or a liquid coolant. More specifically, the charge air cooler may be constructed from a network of finned tubes such that charge air flowing over the fins is associated with a coolant flowing through the tubes resulting in adequate heat transfer for some engine system applications. Alternatively, when improved heat transfer capacity is required, the charge air cooler is constructed from a stacked array of plates and fins which cooperate to define a heat exchanger core having separate flow paths for passage of the charge air and the coolant in close heat transfer relation with each other. In either case, however, the charge air cooler is desirably mounted directly into the intake manifold of the engine wherein charge air passing through the intake manifold is reduced in temperature by flow through the charge air cooler immediately prior to ingestion by the engine.

According to conventional installation techniques, the charge air cooler heat exchanger is mounted within the engine intake manifold by a plurality of bolts extending through opposite sides of the manifold and fastened into appropriate threaded structures on the charge air cooler. With tube-fin type heat exchangers, these threaded structures are normally formed by or mounted on support plates or baffles holding the tubes in spaced relation with each other, but special problems are encountered in providing such threaded structures in heat exchangers of the plate-fin type. More particularly, in the past, the threaded bolt-receiving structures have normally been mounted on the exterior of the heat exchanger where they occupy a substantial portion of the cross-sectional width of the intake manifold. As a result, the overall width of the heat exchanger must be reduced, with a corresponding reduction in total heat transfer capacity, to accommodate the threaded structures. Such reduction in the heat exchanger width unfortunately tends to create bypass flow paths for leakage of charge air around the heat exchanger which, if not closed, result in further reduced heat transfer capacity.

In some applications, it has been proposed to mount a plate-fin type charge air cooler heat exchanger into an engine intake manifold by use of elongated bolts passing entirely through the manifold and the heat exchanger and fastened with a nut located outside the manifold. This mounting technique advantageously permits the charge air cooler to assume an optimized width within the manifold for maximum heat transfer capacity and further eliminates and bypass leakage path around the heat exchanger. However, additional sealing structures are required to seal passage of the bolts through the heat exchanger core, and such sealing structures are particularly crucial when the coolant comprises a liquid coolant of the type circulated from a conventional engine cooling system. Unfortunately, the provision of sealing structures capable of withstanding the thermal stresses and thermal cycling during operation adds significantly to the cost and complexity of the heat exchanger.

There exists, therefore, a significant need for an improved yet relatively simple mounting arrangement for a plate-fin type charge air cooler heat exchanger which will permit the heat exchanger to occupy substantially the entire cross-sectional width of an engine intake manifold for optimum heat transfer capacity while avoiding use of elongated through-bolts and their attendant sealing structures. The present invention fulfills this need and provides further related advantages.

SUMMARY OF THE INVENTION

In accordance with the invention, a plate-fin type heat exchanger is provided with a simplified mounting arrangement for installation into the intake manifold of a combustion engine for cooling charge air supplied to the engine. The heat exchanger comprises a core formed from a plurality of relatively lightweight plate-fin heat transfer elements defining a first flow path for passage of charge air and a second flow path for passage of a coolant in close heat exchange relation with the charge air. A plurality of threaded nuts are secured at predetermined positions within the heat exchanger core to a pair of rigid side plates at the opposite sides thereof and within portions through which the charge air flows. These threaded nuts receive mounting bolts extending through aligned holes formed in opposite sides of the manifold and through the rigid side plates to mount the heat exchanger within the manifold.

According to a preferred form of the invention, the charge air cooler heat exchanger comprises a plurality of first plate-fin elements arranged in an alternating stack with a plurality of second plate-fin elements, wherein the stacked array of plate-fin elements are separated from each other by a plurality of relatively thin and lightweight divider plates. This stacked array is in turn sandwiched between the pair of rigid side plates to form the heat exchanger core. The first plate-fin elements cooperate with the side plates and the divider plates to form a plurality of generally parallel flow openings defining the first flow path for passage of the charge air, whereas the second plate-fin elements cooperate with the divider plates to form a plurality of generally parallel flow openings defining the second flow path for passage of the coolant generally at a right angle to the first flow path. Header bars are interposed between the divider plates at the longitudinal margins of the plate-fin elements to isolate the flow paths from each other, and header tanks are provided at the opposite ends of the second plate-fin element for respectively guiding the coolant for flow into and from the second flow path.

Prior to assembly of the heat exchanger core, the side plates are provided with bolt-receiving holes at predetermined locations in alignment with corresponding bolt-receiving holes formed in the walls of the engine intake manifold. The threaded nuts are then secured in the preferred form of the invention as by welding directly to the inboard faces of the side plates in alignment with the bolt-receiving holes, wherein the nuts may be advantageously supported in the desired position during welding by bolts passed through said holes in the side plates. Portions of the first plate-fin elements to be stacked against the side plates are removed to accommodate the threaded nuts when the core is assembled.

The heat exchanger core, including the nut-carrying side plates, divider plates, and first and second plate-fin elements is assembled in a stack and secured together as by a brazing process to form an integral structural unit. This structural unit has a size and shape for relatively close reception into an engine intake manifold with the plate-fin elements, the side plates, and the divider plates oriented generally in parallel with opposite walls of the manifold.

The assembled heat exchanger core is secured directly into the engine intake manifold by passing relatively short mounting bolts through the bolt-receiving holes in the manifold and further through the aligned holes in the side plates for fastening into the threaded nuts. These nuts are positioned within relatively insignificant portions of the first flow path through which the charge air passes such that charge air flow is substantially unobstructed. The nuts do not extend into any portion of the second flow path and thus no additional structures are required to seal the first and second flow paths from each other. When the bolts are tightened, the nuts bear directly on the associated side plates which have sufficient structural rigidity to withstand the mounting forces without adverse effect on the heat exchanger core.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is an exploded perspective view illustrating mounting of a plate-fin heat exchanger into an engine intake manifold, with portions broken away to illustrate details of the novel mounting arrangement;

FIG. 2 is a top plan view of the plate-fin heat exchanger, with portions broken away to illustrate construction details thereof;

FIG. 3 is a side elevation view of the plate-fin heat exchanger, with portions broken away to illustrate construction details thereof;

FIG. 4 is an enlarged fragmented vertical section taken generally on the line 4—4 of FIG. 3;

FIG. 5 is an enlarged fragmented vertical section taken generally on the line 5—5 of FIG. 4; and FIG. 6 is an enlarged fragmented perspective view illustrating a preferred method of installation of threaded mounting nuts into the plate-fin heat exchanger.

DETAILED DESCRIPTION OF THE PREFERRED EMBODIMENT

As shown in the exemplary drawings, a plate-fin type heat exchanger referred to generally by the reference numeral 10 is provided for use as a charge air cooler for installation quickly, easily, and directly into an engine intake manifold 12 of a combustion engine (not shown). The heat exchanger 10 is securely mounted into the intake manifold 12 by use of a plurality of relatively small bolts 14 passed through the walls of the manifold and fastened into respective threaded fasteners or nuts 66 mounted internally of the heat exchanger in accordance with the mounting arrangement of the present invention to be described.

The heat exchanger 10 functions generally in a conventional manner to permit passage therethrough of charge air supplied to the engine, wherein this charge air has been compressed and thus elevated in temperature by conventional turbocharger or supercharger apparatus (not shown). The heated charge air flows through the heat exchanger 10 in close heat transfer relation with a coolant fluid which is also supplied for flow through the heat exchanger, thereby reducing the temperature of the charge air to correspondingly reduce overall engine heat load. In accordance with the mounting arrangement of the present invention, the heat exchanger can be constructed with a cross-sectional width for occupying substantially the entire width of the manifold thereby preventing bypass leakage of charge air around the heat exchanger and providing optimum heat transfer surface area for optimum heat transfer capacity.

An exemplary intake manifold 12 for use in the heat exchanger mounting arrangement of this invention is illustrated in detail in FIG. 1. As shown, the manifold 12 comprises an upper, generally shell-shaped manifold section 16 and a lower manifold section 18 which cooperate to define a manifold chamber 20 in which the heat exchanger 10 is mounted. The upper manifold section 16 is connected to a charge air supply conduit 22 through which the charge air is supplied from a turbocharger or the like for flow downwardly into the manifold chamber 20 and passage through the charge air cooler 10 prior to discharge to the engine cylinders through a plurality of individual outlet conduits 24, one of which is illustrated in FIG. 1. Conveniently, the manifold sections 16 and 18 respectively include mating flanges 26 and 28 through which a plurality of connecting bolts 30 are fastened to connect the manifold sections securely with respect to each other. If desired, a sealing gasket 32 can be interposed between the flanges 26 and 28 to prevent fluid leakage therebetween.

The heat exchanger 10 comprises a unitary heat exchanger structure with a size and shape to fit relatively closely into the lower manifold section 18 of the intake manifold 12. Accordingly, the charge air passing downwardly through the intake manifold is substantially prevented from bypassing the heat exchanger. Instead, the charge air is constrained to flow through an appropriate flow path in the charge air cooler in heat exchange relation with a coolant which is circulated through an additional flow path in the heat exchanger. In this manner, the temperature level of the charge air advantageously may be reduced to increase charge air density and decrease engine heat load.

While the specific construction details of the heat exchanger may vary, a representative plate-fin heat exchanger is shown in the drawings to include a heat exchanger core defined by a stacked array of light-weight plate-fin heat transfer elements and light-weight divider plates. More specifically, the cooler includes a heat exchanger core defined by a plurality of first plate-fin elements 34 each formed from a light-weight material having relatively high heat conductive properties, such as a thin copper or aluminum sheet, shaped to have a generally corrugated cross section defining an extended heat transfer surface area. These first plate-fin elements 34 are combined with a plurality of second plate-fin elements 36 which are also formed from a lightweight material having high heat conductive properties, such as a thin copper or aluminum sheet shaped to have a generally corrugated cross section defining additional extended surface heat transfer areas.

As viewed best in FIGS. 1-3, the plate-fin elements 34 are oriented in an alternating stack or array with the plate-fin elements 36, and the stacked plate-fin elements 34 and 36 are separated from each other by a plurality of relatively thin and lightweight divider plates 38 of a heat conductive material, such as copper. The entire stack including the plate-fin elements 34 and 36 and the divider plates 38 is in turn sandwiched between a pair of protective side plates 40 of a rigid yet heat-conductive material, such as steel, having a sufficient thickness and structural rigidity to provide mounting bases compatible with the threaded nuts as will be described in more detail.

The plate-fin elements 34 are arranged with their corrugations extending generally vertically as shown in FIG. 3 whereby these elements 34 cooperate with the divider plates 38 and the side plates 40 to define a plurality of vertically extending, relatively small flow openings 42. The flow openings 42 constitute a first flow path for passage of the charge air downwardly through the heat exchanger core when the charge air cooler 10 is mounted with the intake manifold 12. Importantly, the plate-fin elements 34 are arranged such that one of said elements 34 is disposed against each of the two side plates 40.

The second plate-fin elements 36 are arranged with their corrugations extending generally in a longitudinal direction from one end of the heat exchanger core to the other and generally at a right angle to the flow openings 42 defining the charge air flow path. These latter plate-fin elements 36 cooperate with the divider plates 38 to define a plurality of longitudinally extending and relatively small flow openings 44 which provide a second flow path for passage of the coolant in heat exchange relation with the charge air. Importantly, to prevent fluid leakage between the two flow paths, the longitudinal margins of the second plate-fin elements 36 are bounded by longitudinally extending header bars 46 positioned between the associated divider plates 38, and the longitudinal margins of the first plate-fin elements are bounded by vertically oriented header bars 47 between the associated divider plates.

Coolant is supplied to one end of the charge air cooler 10 for flow through the longitudinal flow openings 44 and discharge therefrom at the opposite end of the cooler. More particularly, a generally shell-shaped header tank 50 is supported in a conventional manner at one end of the side plates 40 and the header bars 46 to provide a plenum 52 in open communication with the adjacent ends of the longitudinal flow openings 44. The coolant, such as liquid coolant pumped from an engine radiator-type cooling system, is supplied into this header tank 50 through an inlet tube 54 having a size and shape for close reception through an opening 56 (FIG. 1) in the lower manifold section 18 when the charge air cooler is mounted within the intake manifold. If desired, passage of the inlet tube 54 through this opening 56 can be sealed by use of an appropriate gasket (not shown).

The coolant discharged from the longitudinal flow openings 44 is collected within a plenum 58 defined by a generally shell-shaped header tank 60 supported in a conventional manner at the opposite ends of the side plate 40 and the header bars 46. The collected coolant is then guided away from the charge air cooler for return through an outlet tube 62 to the radiator (not shown) of an engine cooling system. This outlet tube 62 is shaped to fit through an opening 64 in the upper manifold section 16, and passage of the outlet tube 62 through the opening 64 can be sealed by use of an appropriate gasket (not shown).

The component parts of the charge air cooler 10 as described above are all formed from a suitable material having an acceptably high thermal conductivity for efficient transfer of heat between the charge air and the coolant. Moreover, the component parts are all selected from a material compatible with manufacturing techniques for joining them together to form the unitary construction illustrated in FIG. 1, such as a brazing process to provide the unitary cooler construction which can be mounted as a unit into the air intake manifold 12.

In accordance with the invention, the charge air cooler includes the threaded nuts 66 mounted internally within the core and which cooperate with the mounting bolts 14 to permit rapid and easy mounting of the cooler into the engine intake manifold 12. More particularly, each of the side plates 40 includes a plurality of preformed holes 68 formed therein to match and align with corresponding sets of holes 70 preformed in the walls of the intake manifold, and the threaded nuts 66 are mounted at the inboard sides of the side plates in alignment with the holes 68. The nuts 66 are thus positioned to receive the mounting bolts 14 which are passed through the associated walls of the manifold and further through the side plates 40.

The threaded nuts 66 are secured in place at the inboard faces of the side walls 40, as shown best in FIGS. 4-6, prior to assembly of the heat exchanger components to form the core. That is, in a preferred installation method as shown in FIG. 6, the threaded nuts 66 are advanced onto support bolts 13 passed through the holes 68 in the side plate to locate the nuts (FIG. 1), whereupon the nuts can be welded by a welding tool 67 or otherwise fastened directly to the side plate after which the support bolts 13 can be removed. In the illustrative embodiment, four of the nuts 66 are shown welded in a linear arrangement to each one of the side plates 40, although said nuts 66 may be provided in any desired number and pattern selected in accordance with the overall size and shape of the heat exchanger.

The side plates 40, with nuts 66 welded thereto, are then assembled with the first and second heat transfer elements 34 and 36 and the divider plates 38 to form the heat exchanger core. To accommodate this assembly, the threaded nuts have a thickness slightly less than the thickness of the adjacent first heat transfer element 34 which is modified to include clearance apertures 72 for receiving the threaded nuts without interference when the core is formed. Importantly, these apertures 72 are sufficiently larger than the nuts 66 such that the charge air is permitted to flow relatively freely about the nuts 66. However, the apertures are nut sufficiently large to have any significant impact on the overall heat transfer surface area of the heat exchanger.

Accordingly, as shown best in FIG. 1, the heat exchanger 10 fits into the lower manifold section 18 of the intake manifold 12, and the mounting bolts 14 are passed through the walls of the lower manifold section and further through the holes 68 in the side plates for threaded reception into the nuts 66. By sizing the width of the heat exchanger to fit closely into the manifold and by appropriate selection of the lengths of the bolts 12, the bolts 12 may be securely tightened without contacting the outermost divider plates thereby avoiding placing the heat exchanger under significant transverse stress beyond that which can be withstood by the side plates 40.

The mounting arrangement of the present invention thus permits the heat exchanger to occupy substantially the entire cross-sectional width of the manifold thereby optimizing total available heat transfer surface area in the space provided and eliminates all mounting components from between the walls of the manifold and the side plates of the heat exchanger. Moreover, there is no requirement for any bolt or other fastener device to extend through the heat exchanger core, such that additional components to seal passage of such devices are not needed.

A variety of modifications and improvements to the invention described and shown herein are believed to be apparent to one skilled in the art. Accordingly, no limitation on the invention is intended, except as set forth in the appended claims.

What is claimed is:

1. A charge air cooler mounting arrangement for mounting a charge air cooler heat exchanger within an engine intake manifold, comprising:
   a plate-fin heat exchanger core formed by a plurality of plate-fin heat transfer elements arranged in an alternating stack with a plurality of divider plates and said stack sandwiched between a pair of relatively rigid side plates, said core defining a first flow path for charge air and a second flow path for a coolant in heat transfer relation with the charge air;
   a plurality of threaded nuts secured to each one of said side plates at the inboard sides thereof generally in alignment with a plurality of bolt-receiving holes formed in said side plates;
   an engine intake manifold having a chamber formed therein for relatively close sliding reception of said core and bounded on opposite sides by a pair of manifold side walls having a plurality of bolt-receiving holes formed therein generally for alignment with the bolt-receiving holes in said side plates; and
   bolt means for reception through the boltreceiving holes in said manifold side walls and further through the bolt-receiving holes in said side plates for threaded reception into said nuts to secure said core within said intake manifold.

2. The charge air cooler mounting arrangement of claim 1 wherein said plurality of plate-fin heat transfer elements comprises a plurality of first plate-fin elements and a plurality of second plate-fin elements arranged generally alternately in said stack with one of said divider plates disposed between each adjacent pair of first and second plate-fin elements, said first plate-fin elements cooperating with said divider plates and said side plates to define said first flow path, and said second plate-fin elements cooperating with said divider plates to define said second flow path.

3. The charge air cooler mounting arrangement of claim 2 wherein said nuts are secured to said side plates within portions of said first flow path and are isolated from said second flow path.

4. The charge air cooler mounting arrangement of claim 3 wherein each of said nuts has a thickness at least slightly less than the thickness of the first plate-fin elements adjacent said side plates, and wherein said bolt means comprises a plurality of mounting bolts each having a length insufficient to bear against the outermost divider plates in said stack when said bolts are threaded into said nuts for mounting said core into said intake manifold.

5. The charge air cooler mounting arrangement of claim 4 wherein said first plate-fin elements adjacent said side plates have clearance apertures formed therein for aligned reception of said nuts on said side plates, said clearance apertures being sufficiently large to permit substantially unobstructed flow of charge air therethrough about said nuts.

6. The charge air cooler mounting arrangement of claim 1 wherein said nuts are welded to said side plates and wherein said plate-fin heat transfer elements divider plates, and side plates are brazed together.

7. The charge air cooler mounting arrangement of claim 1 including header means for isolating said first and second flow paths for each other.

8. A charge air cooler mounting arrangement for mounting a charge air cooler heat exchanger within an engine intake manifold comprising:
   a plate-fin heat exchanger core formed by a plurality of first and second plate-fin heat transfer elements arranged in a generally alternating stack with each adjacent pair thereof separated by one of a plurality of divider plates and said stack sandwiched between a pair of relatively rigid side plates, said first plate-fin elements cooperating with said divider plates and said side plates to define a first flow path for charge air and said second plate-fin elements cooperating with said divider plates to define a second flow path for a coolant in heat transfer relation with the charge air;
   at least one threaded nut associated with one of said side plates and secured within a portion of said first flow path at the inboard side of said associated side plate and isolated from said second flow path, said one side plate having a bolt-receiving hole formed therein in general alignment with said nut;
   an engine intake manifold having a chamber formed therein for relatively close sliding reception of said core, said manifold having a bolt-receiving opening formed therein generally in alignment with said bolt-receiving opening formed in said one side plate; and
   a bolt for reception through said bolt-receiving opening in said manifold and further through said bolt-receiving opening in said one side plate for threaded reception into said nut, said bolt having a length insufficient to bear against the one of said divider plates adjacent said one side plate.

9. The charge air cooler mounting arrangement of claim 8 wherein said nut is secured to said one side plate.

10. The charge air cooler mounting arrangement of claim 8 wherein said first plate-fin element adjacent said one side plate has a clearance aperture formed therein for aligned reception of said nut.

11. A charge air cooler heat exchanger for mounting into an engine intake manifold, comprising:

a plate-fin heat exchanger core formed by a plurality of first and second plate-fin heat transfer elements arranged in a generally alternating stack with each adjacent pair thereof separated by one of a plurality of divider plates and said stack sandwiched between a pair of relatively rigid side plates, said first plate-fin elements cooperating with said divider plates and said side plates to define a first flow path for charge air and said second plate-fin elements cooperating with said divider plates to define a second flow path for a coolant in heat transfer relation with the charge air; and first and second pluralities of threaded nuts secured within said core respectively to the inboard sides of said pair of side plates within portions of said first flow path and in isolation from said second flow path, said nuts being positioned generally in individual alignment with bolt-receiving holes formed in said side plates;

said first plate-fin elements adjacent said side plates having a thickness at least slightly greater than the thickness of said nuts and having clearance apertures formed therein for aligned individual reception of said nuts.

12. A charge air cooler mounting arrangement for mounting a charge air cooler heat exchanger within an engine intake manifold, comprising:

a plate-fin heat exchanger core formed by a plurality of first and second plate-fin heat transfer elements arranged in a generally alternating stack with each adjacent pair thereof separated by one of a plurality of divider plates and said stack sandwiched between a pair of relatively rigid side plates, said first plate-fin element cooperating with said divider plates and said side plates to define a first flow path for charge air and said second plate-fin elements cooperating with said divider plates to define a second flow path for a coolant in heat transfer relation with the charge air; and first and second pluralities of threaded nuts secured within said core respectively to the inboard sides of said pair of side plates within portions of said first flow path and in isolation from said second flow path, said nuts being positioned generally in individual alignment with bolt-receiving holes formed in said side plates;

said first plate-fin elements adjacent said side plates having a thickness at least slightly greater than the thickness of said nuts and having clearance apertures formed therein for aligned individual reception of said nuts;

an engine intake manifold having a chamber formed therein for relatively close sliding reception of said core and bounded on opposite sides by a pair of manifold side walls having a plurality of bolt-receiving holes formed therein generally for alignment with the bolt-receiving holes in said side plates; and bolt means for reception through the bolt-receiving holes in said manifold side walls and further through the bolt-receiving holes in said side plates for threaded reception into said nuts to secure said core within said intake manifold, said bolt means including a plurality of bolts each having having a length insufficient to bear substantially against the outermost divider plates in said stack adjacent said side plates.

13. The charge air mounting arrangement of claim 12 wherein said nuts are welded to said side plates and wherein said first and second plate-fin heat transfer elements, divider plates, and side plates are brazed together.

* * * * *